United States Patent [19]

Koohgoli et al.

[11] Patent Number: 4,771,448

[45] Date of Patent: Sep. 13, 1988

[54] PRIVATE CELLULAR SYSTEM

[75] Inventors: Mahshad Koohgoli; Bambino Fatica, both of Ottawa, Canada

[73] Assignee: Northern Telecom Limited, Montreal, Canada

[21] Appl. No.: 36,730

[22] Filed: Apr. 10, 1987

[30] Foreign Application Priority Data

Nov. 18, 1986 [CA] Canada ................................ 523221

[51] Int. Cl.$^4$ ............................................. H07Q 7/01
[52] U.S. Cl. ................................... 379/60; 455/33; 379/63; 379/59
[58] Field of Search ............... 379/61, 63, 60, 59, 379/58; 455/33

[56] References Cited

U.S. PATENT DOCUMENTS

| | | | |
|---|---|---|---|
| 3,760,106 | 10/1973 | Monti . | |
| 3,955,140 | 11/1976 | Stephens et al. | 455/11 |
| 3,984,807 | 10/1976 | Haemmig | 455/11 |
| 4,028,500 | 6/1977 | McClure et al. | 379/60 |
| 4,096,440 | 6/1978 | Okasaka | 455/33 |
| 4,210,780 | 7/1980 | Hopkins et al. | 370/80 |
| 4,562,572 | 12/1985 | Goldman et al. | 370/80 |
| 4,628,152 | 12/1986 | Akerberg | 379/59 |
| 4,661,972 | 4/1987 | Kai | 379/57 |
| 4,669,107 | 5/1987 | Eriksson-Lennartsson | 379/60 |
| 4,672,658 | 9/1987 | Kavehrad et al. | 379/63 |

FOREIGN PATENT DOCUMENTS

| | | | |
|---|---|---|---|
| 0027636 | 2/1984 | Japan | 379/63 |
| 86/06915 | 11/1986 | PCT Int'l Appl. | 379/61 |
| 2162404 | 1/1986 | United Kingdom | 379/59 |

OTHER PUBLICATIONS

Millicom Advertisement "Cellular Portable Telephone", 11/84.

"Cellular System Design: An Emerging Engineering Discipline", by J. F. Whitehead in IEEE Communications Magazine, FEb. 1986, vol. 24, No. 2.

Primary Examiner—Robert Lev
Attorney, Agent, or Firm—Robert C. Hogeboom

[57] ABSTRACT

A cellular mobile radio communication (e.g. telephone) system (hereinafter referred to as a private cellular system, PCS) that does not have the constraint of being a well defined, pre-planned system. The present invention differs from previous systems largely by the fact that it does not have to be well planned in advance. A user can simply install a base station virtually wherever he desires. Each base station is "intelligent" and produces a dynamic allocation. This of course means that if one were to install such a system, for example in an office building, no studies would be required. One would simply install a series of base stations.

11 Claims, 6 Drawing Sheets

SEQUENCE OF EVENTS
FOR CALL INITIATION
BY PORTABLE 16

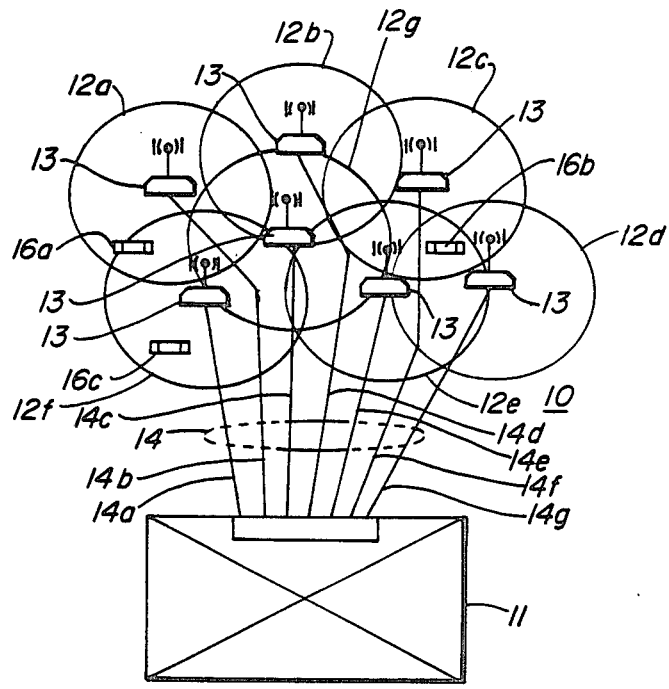
FIG. 1
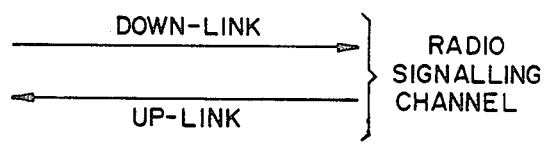
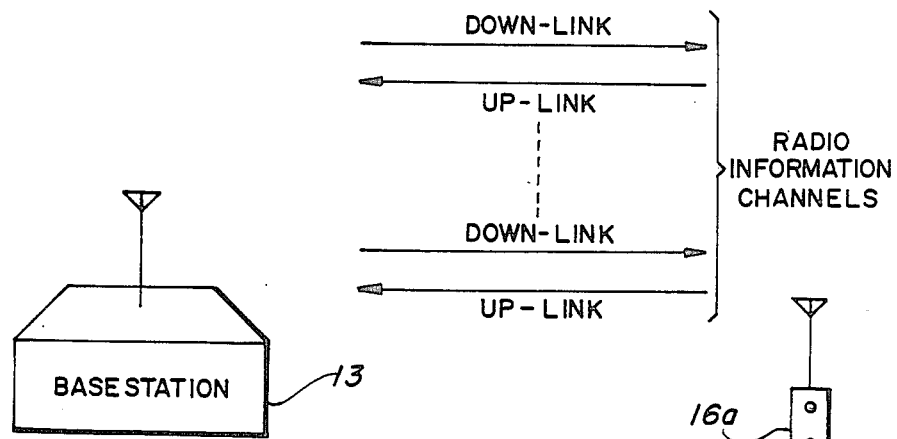
FIG. 2

SEQUENCE OF EVENTS
FOR CALL INITIATION
BY PORTABLE 16

STATE DIAGRAM OF ACTIVITIES IN A PORTABLE 16

SEQUENCE OF EVENTS FOR CALL INITIATION BY SWITCH 11

FIG. 6 STATE DIAGRAM OF ACTIVITIES IN A BASE STATION 13

PRIVATE CELLULAR SYSTEM

This invention relates generally to a cellular radio system, and more particularly to such a radio system used to provide telephony services.

BACKGROUND OF THE INVENTION

Cellular mobile radio telephone systems are well known. In such a system radiotelephone units utilize radio frequencies to communicate with relatively low power, relatively limited radiation base transceivers arranged in cellular pattern. This makes it necessary for the system to locate each radiotelephone unit and follow it enroute by "handing off" in-progress calls as the units move between cells. An overview of such systems can be found in the article "Cellular System Design: An Emerging Engineering Discipline" by J. F. Whitehead in *IEEE Communications Magazine* February 1986, Vol. 24 No. 2.

Such systems are described in more detail in the following U.S. patents to which attention is directed: U.S. Pat. No. 4,562,572 dated Dec. 31, 1985 to S. O. Goldman et al.; U.S. Pat. No. 4,096,440 dated June 1978 to Okasaka; U.S. Pat. No. 4,028,500 dated June 1977 to McClure et al.; U.S. Pat. No. 3,984,807 dated October 1976 to Haemmig; and U.S. Pat. No. 3,760,106 dated October 1973 to Monti. A signalling system that may find application in a cellular radio system is described in U.S. Pat. No. 4,210,780 dated July 1, 1980 by G. T. Hopkins et al. to which attention is also directed.

The prior art cellular radio systems are generally well engineered, pre-planned, and rigidly laid out systems. That is, the entire area to receive a cellular radio system is surveyed, sites are chosen for base stations, frequencies are allocated, etc. Once the planning for the system has been conducted, the system is built strictly according to the plan; the system may be expanded at a later date by adding "cells" at the periphery of the system, but the core of the system is virtually "cast in stone".

Alternatively, "cell splitting" may be used to increase the capacity of the system by a factor of 2 or 3. This is achieved by installing new base stations and specially engineered directional antennas at specific locations. The cell splitting method requires extensive planning and engineering effort.

The existing city-wide cellular radio systems may well be the most complex non-military radio communication systems ever put into operation. The cellular mobile telephone system has evolved through many years of research, from the early work on characteristics of various hexagonal cell configurations for frequency reuse, to the present architecture of an extensive centrally controlled system. Currently, cell planning is an elaborate engineering exercise that spans various phases of cellular design and operation. A typical city-wide cellular radio system is a centrally controlled one wherein certain parameters (like transmission power of base stations and the mobiles) are automatically controlled. Other parameters (such as channel allocations per cell) are fixed and only after a redesign of the system can they be changed by an operator.

An in-building communication system based on a scaled-down version of the city-wide cellular radio would be an overkill and operationally inefficient, as it would inherit unnecessarily all the engineering complexities of the cellular mobile radio. The present invention addresses a different need, and is required to operate in a different environment, than the city-wide cellular system.

SUMMARY OF THE INVENTION

The present invention is directed to a cellular mobile radio communication system (hereinafter referred to as a private cellular system) that does not have the constraint of being a well defined, pre-planned, system. The present invention is directed to (but not limited to) the application of personal telephone sets and data modems that could be used by an individual in, for example, a large office building. The user could simply carry his telephone wherever he went in the building. Through the wireless data modem, the user could connect his personal computer to other data processing equipment without the need for a cable.

The private cellular system of the present invention differs from previous systems largely by the fact that it does not have to be well planned in advance. A user can simply install a base station virtually wherever he desires. Each base sation is "intelligent" and produces a dynamic allocation. This of course means that if one were to install such a system, for example in an office building, no studies would be required. One would simply install a series of base stations. If one area of the building were found to have poor reception, then another base station could be installed at that location. Once the system is installed, if one wanted to add more base stations, then they are just added; if one wanted to move some base stations (because of office reconfigurations, etc.) then one would just move the base stations. The fact that tnere may be overlap in the coverage area of two or more base stations is of no consequence.

Reduction in complexity is due to a variety of factors including shared radio channels between all cells, transfer of the decision mechanism from a central point to distributed low cost base stations, low transmission powers, simple signalling schemes, flexible cell structure and finally due to the fact that "hand-off" is not believed to be a major requirement for in-building operation. Cellular mobile radio was primarily designed for operation by moving vehicles, where crossing a cell boundary during communication is a frequent event. The situation is believed to be different in an in-building system, as it is felt that few people would 'talk-and-walk'. It is believed that the present invention can support the limited hand-off requirements needed with little impact on the existing switch resources.

The Private Cellular System (PCS) of the present invention is a concept that aims at providing portable (cordless) communication (e.g. telephony) services to users normally served by a PBX (Private Branch Exchange) or CENTREX system. These services are primarily used for voice or data communication.

The private cellular system of the present invention provides a controlled coverage area using a number of very low power (e.g. 1–10 mW) radio transceivers (i.e. transmitter, receiver combination) as base stations. A small-cell structure is used to provide spectrum efficiency by frequency reuse. Cell management is performed locally by the base stations. Each base station is connected to the resident telephony switch by a multi-channel two-wire link. A number of portable communication devices (telephones or data modems) can be supported by each base station. A limited number of radio channels are shared between all cells and a dynamic channel allocation scheme, implemented locally by the base stations, assigns them to portables on demand.

The PCS structure is flexible in that it is capable of automatically adjusting to the carrying call traffic densities and user concentrations, is easily expandable for extended coverage area, and can adapt to changes in the radio propagation patterns of the area it serves.

Procedures involved in call initiation and termination are described later.

Stated in other terms, the present invention is a private cellular system for providing a wireless comunication service, the system characterized by: at least one base station for connection to a telephone switching means, the base station capable of transmitting and receiving simultaneously on a plurality of frequencies; a plurality of portable terminal units for communicating with the base station, each portable terminal unit capable of receiving on at least a first frequency while simultaneously transmitting on a second frequency; each portable terminal unit capable of scanning at least some of the plurality of frequencies on which the base station can transmit and the portable terminal unit can simultaneously receive two of the frequencies on which the base station can transmit; each portable terminal unit includes means to initiate a call by: (a) monitoring a common wireless signalling channel for communication between the portable terminal units and at least one base station; (b) sending a request for service message to the base station; when the common wireless signalling channel is deemed idle; (c) receiving offer messages destined for the terminal unit and sent by contending base stations; (d) evaluating each offer message and accepting the offer message that meets the criteria of (i) the information channel offered by the base station is idle in the terminal unit's vicinity and (ii) the offer message has the best weighting of the signal strength of the terminal unit's signal as received by the base station, the received signal strength by the terminal unit, and any priority level given by the base station via the offer message; (e) acknowledging acceptance of one offer message by sending an acknowledge message to the base stations, the acknowledge message including the identification of the base station whose offer has been accepted; and (f) turning on a corresponding up-link information channel, in response to the detection of a wireless carrier signal on the selected down-link information channel.

Stated in still other terms, the present invention is a method of operating a private cellular system for providing a wireless communication service using a plurality of base stations and a plurality of portable terminal units, the method characterized by: (a) monitoring at each portable terminal unit the idle status of a common wireless signalling channel used for communication between the portable terminal units and the base stations; (b) selectively transmitting a request for access to an information channel between one portable terminal unit and the base stations in response to the signalling channel being idle; (c) at each base station that receives the request for access to an information channel (i) checking to see if the request was received properly, (ii) checking to ensure that there is at least one wireless information channel to offer; and (iii) checking to ensure that there is at least one land information channel available for use; (d) each base station that received the request and at which all three conditions of step (c) are met, selecting one wireless information channel to be offered to the portable terminal unit and transmitting to the portable unit, an offer to provide service message, the message comprising the identification of the portable terminal unit to which the offer is directed, the offered channel identification, an indication of the received signal strength at that base station, and a priority code indicative of the load status of the base station; (e) the portable terminal unit evaluating each valid offer message and accepting the one that satisfies the conditions of (i) the offered information channel is idle in the portable unit's area, and (ii) the offer message having the best weighting of the signal strength as received by the base station, the received signal strength at the portable terminal unit, and the priority code; (f) the portable terminal unit acknowledging acceptance of one offer message by sending, via the wireless signalling channel, an acknowledge message containing the identification of the base station whose offer is being accepted; (g) the base station whose offer has been accepted, responding by turning on the carrier on the offered down-link wireless information channel; (h) the portable terminal unit responding to the reception of the down-link carrier by turning on the corresponding up-link carrier.

Stated in yet other terms, the present invention is a portable terminal unit for use in the operation of a private cellular system for providing a wireless communication service using a plurality of base stations connected to at least one telephone switching means, and a plurality of portable terminal units, the portable terminal unit characterized by: (a) first means for monitoring the idle status of a common wireless signalling channel used for communication between the portable terminal units and the base stations; (b) second means for selectively transmitting a request for access to an information channel between the portable terminal unit and one base station in response to the signalling channel being idle; (c) third means for monitoring the common wireless signalling channel for offer to provide service messages from the base stations, and for evaluating each valid offer message and for accepting the one that satisfies the conditions of (i) the offered information channel is idle in the portable unit's area, and (ii) the offer message having the best weighting of the signal strength as received by the base station, the received signal strength at the portable terminal unit, and a priority code; (d) a fourth means for acknowledging acceptance of one offer message by sending, via the wireless signalling channel, an acknowledge message containing the identification of the base station whose offer is being accepted.

BRIEF DESCRIPTION OF THE DRAWINGS

The invention will now be described in more detail with reference to the accompanying drawings wherein like parts in each of the several figures are identified by the same reference character, and wherein:

FIG. 1 is a simplified block diagram of the private cellular system of the present invention;

FIG. 2 is a simplified symbolic representation of the channels between a base station and a portable unit;

DETAILED DESCRIPTION

Figure 3:
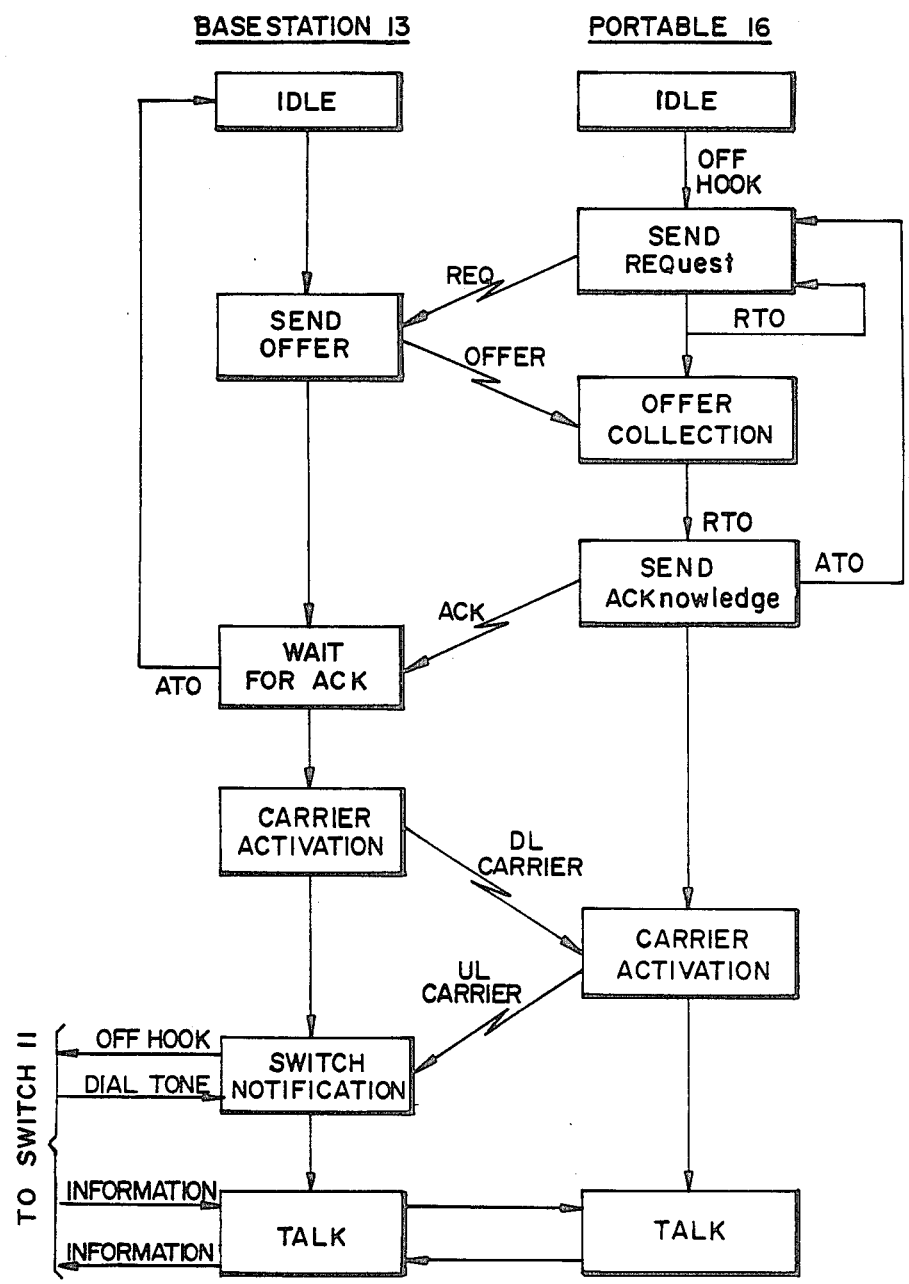
FIG. 3 is a simplified diagram depicting the sequence of events for a call initiated by a portable unit.

The private cellular system (PCS) of the present invention is a concept developed in order to provide portable (cordless) telephony services to users normally served by a local PBX or CENTREX system. As such, it will extend the services offered by those telephone switches to portable telephones. The major characteristics of PCS are:

1. It is preferably fully digital.
2. It provides POTS (plain old telephone service).
3. It preferably provides data communication services.
4. It extends the features offered by the local PBX. These features may include call forwarding, conferencing, call transfer, call waiting, ring again, etc. Also, preferably, normal data communication services offered by the PBX (e.g. networking) are supported by PCS.
5. The system, is expandable. In this context, the expandability is defined in terms of providing coverage where required, servicing higher user densities when needed, and covering a wider area with a proportional increase in the number of users.
6. The system is capable of automatically adjusting to the call traffice densities and patterns.
7. The system has access to a limited radio frequency spectrum, divided into a limited number of full duplex channels. The allocation of these channels and their distribution between cells is automatic and requires no operator intervention when the operating conditions (traffic distribution) change.
8. The system requires no elaborate engineering effort for initial setup. The interaction between the properties of the coverage area and the operation of the system are minimized. Furthermore, expansion of the system requires no elaborate engineering effort as is the case with the prevalent city-wide cellular system (Cell Splitting).
9. The coverage area is controlled and spilling of the radio information outside the intended coverage area is minimized.

FIG. 1 is a simplified block diagram depicting the private cellular system (PCS) 10 of the present invention connected to a telephone switch 11 such as an SL-100 (Northern Telecom trademark) Private Branch Exchange (PBX).

The concept of PCS 10 is based upon a number of cells 12a... 12n (refered to collectively as cells 12) wherein each cell 12 is defined by the coverage area of a base station 13, typically measuring 300 sq. meter (2700 sq. ft) in area. Assuming a circular cell boundary, the radius of each cell 12 is therefore about 10 meters.

The number of users per cell 12 is by no means constant, but by design, an effort is made to minimize the variance of the expected number of users per cell 12. This may result in certain cells 12 having a larger area (for example cells that cover transient areas such as passageways or open campus areas).

The cells 12 can be overlapping, such that any point can be covered by a number of cells 12 and therefore base stations 13. The overlapping cell concept is exploited to increase the redundancy of the system in case of traffic overloads or base station 13 breakdown.

At the center of each cell 12 a base station 13 is located. Each base station 13 consists of:

(a) facilities for simultaneous transmission on a number of radio frequencies, (e.g. 20 to 30);

(b) facilities for simultaneous reception of a number of radio frequencies, (e.g. 20 to 30);

(c) suitable interface to the local PBX (or CENTREX) system for a multitude of digital information channels (voice or data) and a signalling channel. One such link can be (but not limited to) ISDN. These are depicted as land lines 14 in FIG. 1; and (d) processing capability for interpretation and action on the information carried over the land-based signalling channel, for procedures involved in call initiation by the portable, registration, or call termination on the portable units, as well as various foreground routines and normal maintenance procedures.

The criterion for geographical location of base stations 13 is the coverage required. In other words, the base stations 13 can be arbitrarily placed in various locations such that the intended areas are covered. No spectrum planning or elaborate cell-location design is required.

Physically, the base stations 13 are designed to be small and unobtrusive, preferably with hidden antennas.

The portable terminal units 16a... 16n (which are referred to collectively as terminal units 16 and of which only 16a, 16b, and 16c are depicted) are access terminals to PCS 10 for voice or for data applications. Each portable terminal unit 16:

(a) has facilities for scanning all of the down-link radio information channels;

(b) can simultaneously receive one radio information channel and the radio signalling channel (definitons of these channels follow);

(c) has the processing power to interpret the messages on the radio signalling channel and take appropriate action on them; and (d) can offer all the functionalities normally provided by POTS, e.g. dialling, voice transmission/reception, alerting.

A radio channel, as the term is used in this document, is a full duplex radio communication link comprising two frequencies. The part of the channel (frequency) used for communication from portables 16 to base stations 13 is called the up-link. The part of the channel (the frequency) used for communication from the base stations 13 to the portables 16 is called the down-link. This is illustrated symbolically in FIG. 2.

One radio (wireless) channel is reserved for control functions and is called the radio signalling channel. The portables 16 transmit on the up-link of the signalling channel while the base stations 13 transmit on the down-link of the signalling channel. All other radio (wireless) channels are used for actual communication (voice or data) and hence they are called radio information channels.

The information on the radio signalling channel is digital. All control transactions are sent as a series of data bits. As such, the portables 16 and the base stations 13 have the capability to transmit and to receive information in the form of digital data on the radio signalling channel.

The radio information channels carry information in digital form. There is one radio signalling channel only per system although for reliability reasons, a number of reserve signalling channels are always available. The number of radio information channels is preferably from 10-20 channels.

Communications between each base station 13 and PBX 11 is via land channels carried by a land line 14. Each land line 14 is comprised of one twisted wire pair (only 7 and lines 14a...14g are shown in FIG. 1, for seven base stations 13).

A land channel is a logical full duplex communication link between a base station 13 and the resident switch 11 serving the premises; the land channels carry digital information (bits). Each base station 13 can communicate with the switch 11 over a number of land channels. The physical link carrying the land channels is a twisted wire pair 14a, possibly the existing phone wire, over which the individual land channels are combined (multiplexed).

One of the land channels is reserved for signalling between the base station 13 and the switch 11. This channel is called the land signalling channel. The other channels carry the information relayed to/from the portables 16. These channels are called land information channels.

All land channels are digital channels. Each land information channel has adequate capacity for carrying one digitized voice signal between the involved base station 13 and the switch 11.

The number of land information channels available to each base station 13 defines the number of simultaneous calls that each base station 13 can support. This number is less than the total number of radio information channels and is preferably from 2 to 8 channels. Assuming 64 Kb/sec. information channels and 16 Kb/sec. signalling channel, the total bit rate on a physical land line 14 is 144 Kb/sec. to 528 Kb/sec. (per base station 13).

CALL PROCEDURES

The procedures involved in setting up and bringing down a call are described below. Where applicable, exceptional cases are considered and actions taken are given.

The operations covered through call procedures are:
(a) call initiation by the portable 16;
(b) call reception by the portable 16;
(c) call termination.

CALL INITIATION BY PORTABLE 16

The simplified sequence of events is shown in FIG. 3.

1. A portable 16 initiates a call by physically going offhook. This triggers a REQuest message (REQ; i.e. request for service) to be transmitted to all surrounding base stations 13 on the radio signalling channel. The message transmission is of 'unslotted ALOHA type' with carrier sense. That is, the portable 16 senses the activity of the uplink signalling channel and if the channel is free, it transmits the REQuest message (refer also to FIG. 7). If for any reason the REQuest message is not received by any base station 13, the portable 16 retransmits the REQuest after a specified timeout period (REquest Time Out, RTO) in addition to a random time delay. Embedded in the REQuest message is the ID (identification) of the portable 16 that initiated it. Note that the convention used in this document is to capitalize the first few letters of the command in question. For example, the request for service message is shortened to "REQuest" and is abbreviated by using only the capital letters alone, e.g. "REQ".

2. The REQuest message may be received by a number of base stations 13 (total cell-overlap operation).

Each base station 13 that receives the REQuest messge performs the following functions:
(a) checks to ensure the message was received properly;
(b) checks to ensure it can offer a radio information channel (i.e. it does not detect any activity on at least one radio information channel in that area);
(c) checks to ensure it has at least one land information channel (connection to the switch 11) available.

If all the above conditions are met, each base station 13 involved chooses, from the common pool of available radio information channels, one channel to be offered to the portable 16. At the same time, the base station 13 temporarily marks the offered radio channel and the selected land channel as 'occupied' in its internal list.

3. All the base stations 13 with a channel to offer transmit an OFFER to provide service message (OFFER). The OFFER message contains such information as the ID of the portable 16, base station 13 ID and the offered channel ID, as well as an indication of the received signal strength at the base station 13 and a priority tag (code) whose function will be described shortly. The transmission of the OFFER messages on the down-link radio signalling channel is a carrier-sense ALOHA type. All the base stations 13 will transmit their offers within a predetermined REQuest Time Out (RTO) period. The actual time of the transmission is selected by a base station 13 as an evenly distributed random value between 0-RTO. The probability of Success (getting an OFFER message to the portable 16) is the chance that at least one OFFER message is received by the portable 16. If all the offers fail to reach the portable 16, the portable 16 times out (RTO) and sends another REQuest, FIG. 4. Base stations 13 detect this condition by either:
(a) receiving a second REQuest from the same portable 16 before their OFFER message was acknowledged; or
(b) absence of a carrier on the offered channel.

4. During the time out period RTO the portable 16 listens on the radio down-link signalling channel and collects valid OFFER messages destined for it. After this time the portable 16 evaluates each OFFER message and accepts one that satisfies the following conditions:
(a) the offered channel is quiet in the portable's area; and
(b) the OFFER message has the 'best' weighting of the signal strength (given in the OFFER message), the received signal strength by the portable 16, and the 'priority level' given in the OFFER message.

The signal strengths need coarse representation (2 bits). The priority tag (sent by the base station 13) indicates how many more radio or land-based information channels are available to the base station 13. This information is used by the portable 16 in such a way that, everything else being equal, the base station 13 with the highest number of unused channels is selected.

5. The portable acknowledges acceptance of an OFFER message by sending an ACKnowledge message (ACK) on the uplink radio signalling channel. The method of transmission is again an unslotted ALOHA type with carrier sense. The ACKnowledge message contains the ID of the base station 13 whose offer is being accepted. A timer is started as soon as the ACK is transmitted. If the ACK fails to reach the intended base station 13, the Acknowledge Time Out (ATO) is exceeded in the portable 16. In this case, the whole procedure is restarted from step 1, above.

6. The ACKnowledge message is received by all the adjacent base stations 13. If any base station 13 does not receive the ACKnowledge message, it will time out (ATO) and return to the idle state. Base stations 13 that do not detect their ID in the ACKnowledge message also return to the idle state. By returning to the idle state, they mark their offered radio channel and land channel as 'available'. The base station 13 whose offer is accepted detects this condition by receiving its own ID in the ACKnowledge message. The base station 13 then responds by turning on the carrier on the offered down-link radio information channel (DL CARRIER).

7. The portable 16 detects the down-link carrier and responds by turning on the corresponding up-link carrier (UL CARRIER).

8. At this stage a link is established between the portable 16 and the selected base station 13. Upon receiving the uplink carrier from the portable 16, the base station 13 supplies the switch 11 (FIG. 1) with the following information:

(a) an off-hook message;
(b) portable 16 ID (calling number identification); and
(c) selected land-based channel.

The land signalling channel between the base station 13 and tne switch 11 is used for this purpose. In an ISDN environment, the D channel would be the signalling channel.

9. Switch 11 checks the validity of the calling number (portable 16 ID). If the ID is valid, switch 11 confirms the selected land information channel with the base station 13, and signals the portable 16 by sending dial tone through the voice channel. At this point, base station 13 becomes transparent. All the usual call progress signalling between switch 11 and the portable 16 take place in the normal telephony manner between base station 13 and switch 11. Base station 13 relays this information to and from portables 16 via the radio signalling and information signals.

In ISDN parlance, the portable 16 becomes a stimulus terminal and as such, the usual stimulus signalling procedure is used between the portable 16 and switch 11, with the base station 13 simply relaying the information between the land channels and the radio channels.

CALL RECEPTION BY THE PORTABLE

In private cellular system 10, the primary requirement for call reception by the portable 16 is the need for the switch 11 to locate the called portable 16. One possible technique is for all base stations 13 to broadcast a 'search' message over the radio signalling channel, once a call has arrived for a particular portable 16. This method is not used due to the extreme demand it imposes on the uplink radio signalling channel. Another possible technique is for the portables 16 to 'register', at regular intervals, with their surrounding base stations 13. The base stations 13 would in turn relay the information to switch 11. This method is rejected for two reasons:

Firstly, the traffic on the land signalling channel (to the switch 11) would increase dramatically. It is felt that the switch 11 (or the peripheral dedicated to the portables 16 supported by the switch 11) would not be capable of coping with this high flow of information. The functions that would be required on the switch 11 side would be checking the validity of the multiple registration messages (many base stations 13 would report reception of these messages), accessing and updating the corresponding tables, and retrieving the location information when a call is destined for any of the portables 16.

Secondly, this technique would require extensive new software to be written for the switch 11. One aim is to reduce the impact on the switch side and use, as much as possible, the existing switch 11 resources. The philosophy of the subject system is to reduce the amount of central control and concentration, and distribute the intelligence among the aggregate system components.

The technique that is used is presented below and uses the concept of 'registration' in a different manner.

REGISTRATION

The portables 16, when not in the 'talking' state, regularly transmit a REGistration message (REG). The repetition rate of the REGistration message is preferably about once every 10 seconds, depending on such factors as the coverage radius of each portable's transmitter (10 meters) and the typical distance that a user can 'walk' in the registration interval. The manner of transmission is random (unslotted ALOHA) with carrier sense. Although 'carrier sense' reduces the probability of collision to a large extent, it is acknowledged that some of the REGistration messages will collide with each other. If the base stations 13 receive a garbled REGistration message, they will simply ignore that mesage and capture it later. The portables 16 transmit the REGistration messages at random within some timing window, so as to overcome a continuous collision state. A detailed analysis of this scheme is given in a latter section.

Registration messages may be received by a number of base stations 13. Each base station 13 maintains a list of resident portables 16. This list is internal to every base station 13 and is not communicated to the switch 11. If a base station 13 does not receive a valid registration from a resident portable 16 within a predetermined number of registration periods (e.g. five), the portable 16 ID is deleted from this list.

CALL RECEPTION

Figure 5:
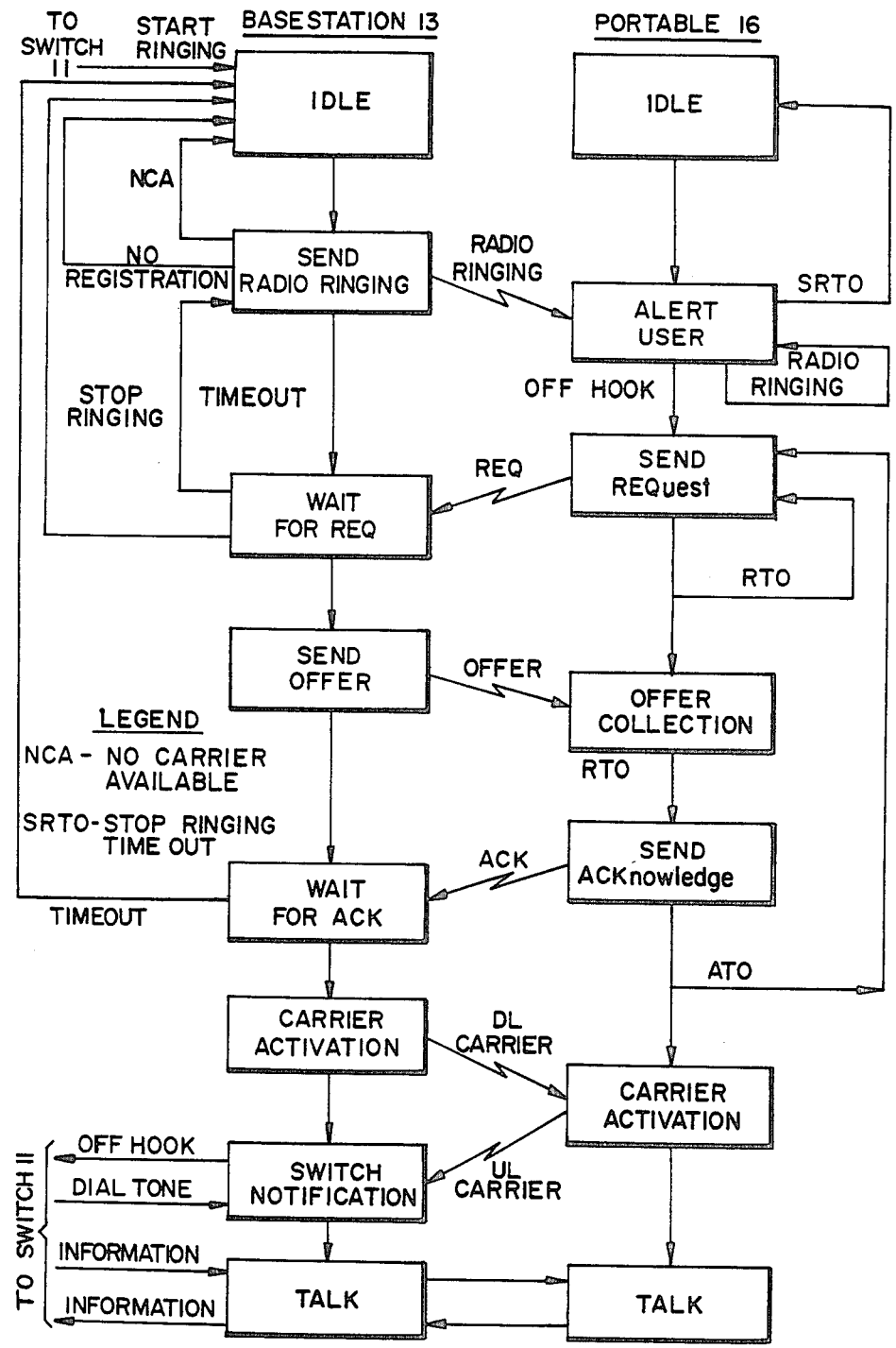
FIG. 5 is a simplified diagram depicting the sequence of events for a call initiated by a telephone switch (via a base station)

The simplified sequence of events is shown in FIG. 5.

1. The switch 11 broadcasts a Start Ringing message to all the base stations 13 using the land signalling channel. This message contains the ID of the called portable 16 and optionally that of the calling party.

2. Those base stations 13 which contain the called portable 16 ID in their resident list and have access to a free land information channel transmit a Radio Ringing message. All base stations 13 insert the ID of the called portable 13 into a local Wanted List. This list, at each base station 13, contains the ID of all portables 16 that have a call waiting for them (not yet answered). The transmission of the Radio Ringing message is unslotted ALOHA with carrier sense.

3. The base stations 13 retransmit the Radio Ringing messages for all the resident portables 16 periodically until they are told to stop doing so by the switch 11 (Stop Ringing message). If a base station 13 receives a registration message from a portable 16 that is in the Wanted List, that base station 13 will transmit a Radio Ringing message. If the caller hangs up, switch 11 sends a Stop Ringing message to all the base stations 13. This message contains the called portable 16 ID. Upon reception of a Stop Ringing message, all base stations 13 remove the called portable 16 ID from their wanted lists.

4. The called portable 16 alerts the user once it has received a Radio Ringing message. The mechanism for alerting the user resides on the portable 16.

5. When the user answers the call at portable 16 (by physically going offhook), a normal REQuest message is sent to all the surrounding base stations 13.

6. Steps 1 through 8 of CALL INITIATION BY PORTABLE 16 are repeated. At the conclusion of step 8, a radio voice (information) channel has been established between a base station 13 and the called portable 16. The base station 13 has supplied switch 11 with the following information:
 (a) an offhook message;
 (b) the portable 16 ID; and
 (c) the selected land information channel.

7. Switch 11 checks the validity of the ID of the portable 16. If the ID is valid, it confirms the selected land information channel with the base station 13. The switch 11 also sends a Stop Ringing message to all the base stations 13. All base stations 13 delete the called portable 16 ID from their Wanted Lists. Switch 11 connects the caller to the called portable 16.

CALL TERMINATION

Termination of a call by a portable 16 results in the loss of the up-link carrier of the assigned radio information channel. The involved base station 13 detects this condition, sends an onhook signal to switch 11 and marks the radio and the land channels as 'available'.

Termination of a call by the far end party does not trigger any action in the base stations 13 or the portable 16. The state of affairs continues until the portable 16 hangs up. This is in accordance with the procedures currently used in telephony services.

CALL PROCEDURE STATES

Figure 4:
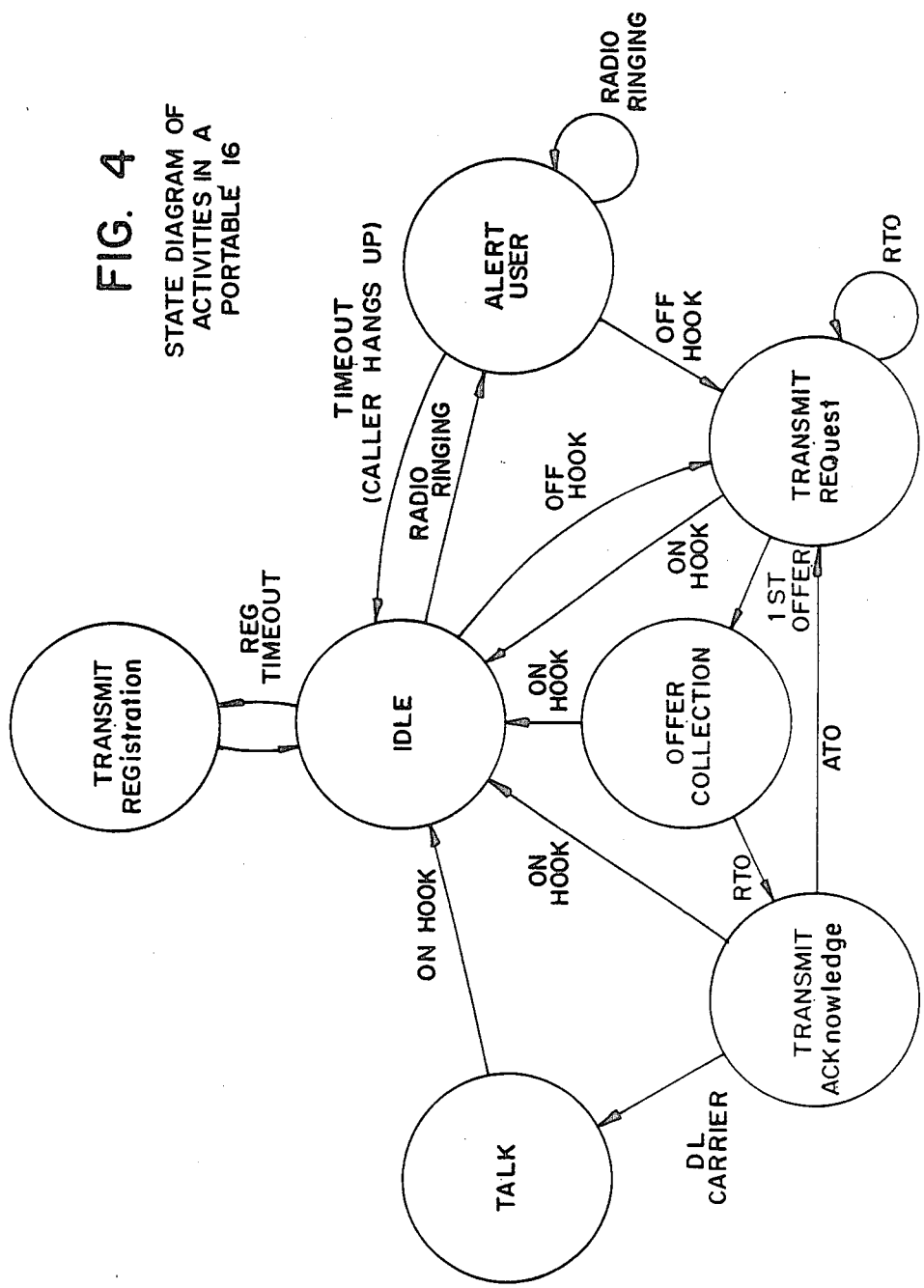
FIG. 4 is a simplified state diagram of the activities in a portable unit.
Figure 6:
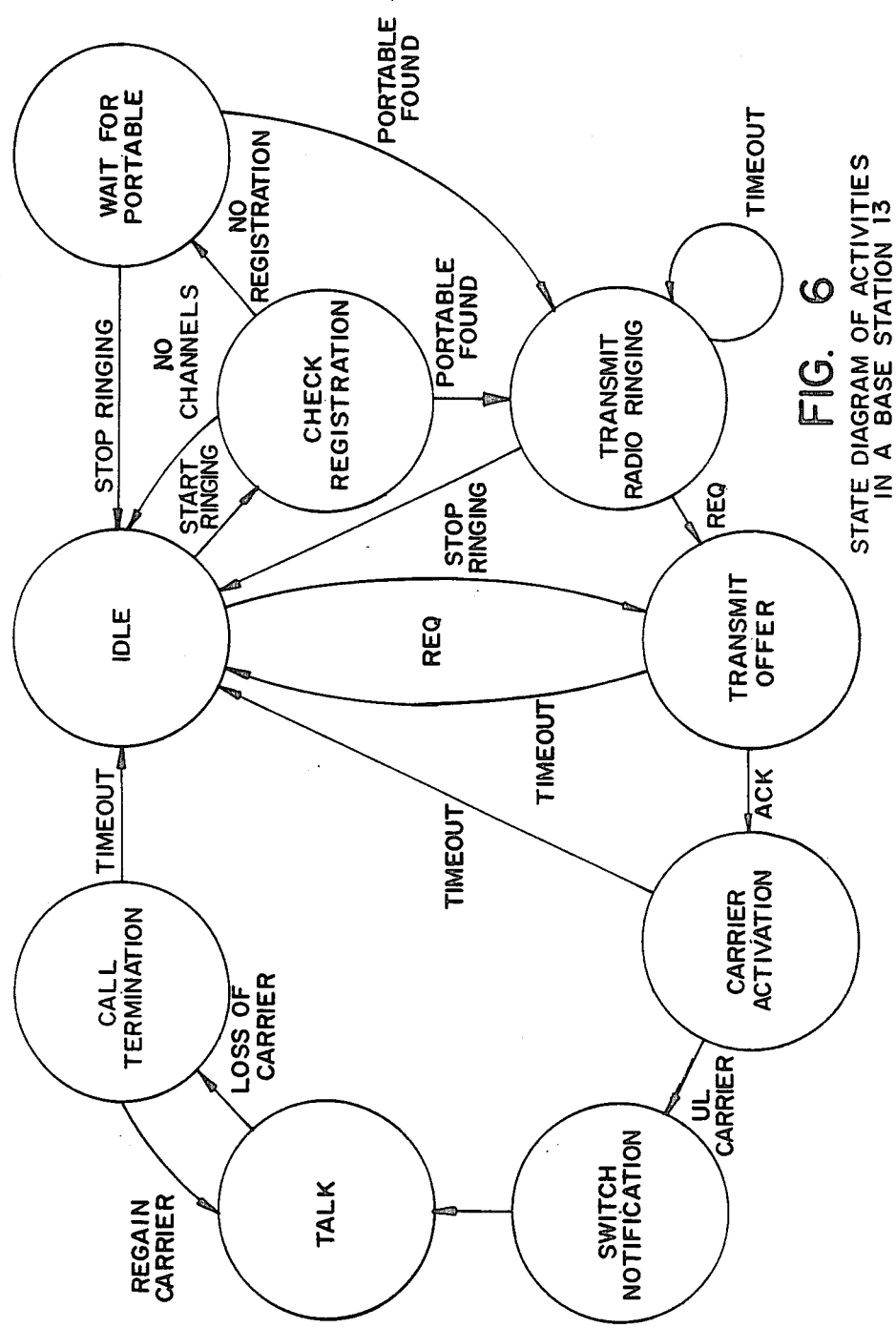
FIG. 6 is a simplified state diagram of the activities in a base station.

FIGS. 4 and 6 depict states and transitions between the states for the portable units 16 and base stations 13 respectively.

Radio Signalling Channel Access Mechanism (for portables and base stations)

Since a number of portable units 16 can access the radio signalling channel, cases of contention may arise. Standard techniques such as collision sense (using an echo channel or otherwise) are not believed applicable here because:
 (a) the radio transmitters cannot detect collisions; and
 (b) there is no single master of the radio signalling channel, therefore the echo channel itself would be subject to collisions.

The technique described below is intended to minimize the chances of contention and to ensure an orderly access to the radio signalling channel by multiple units 16.

Figure 7:
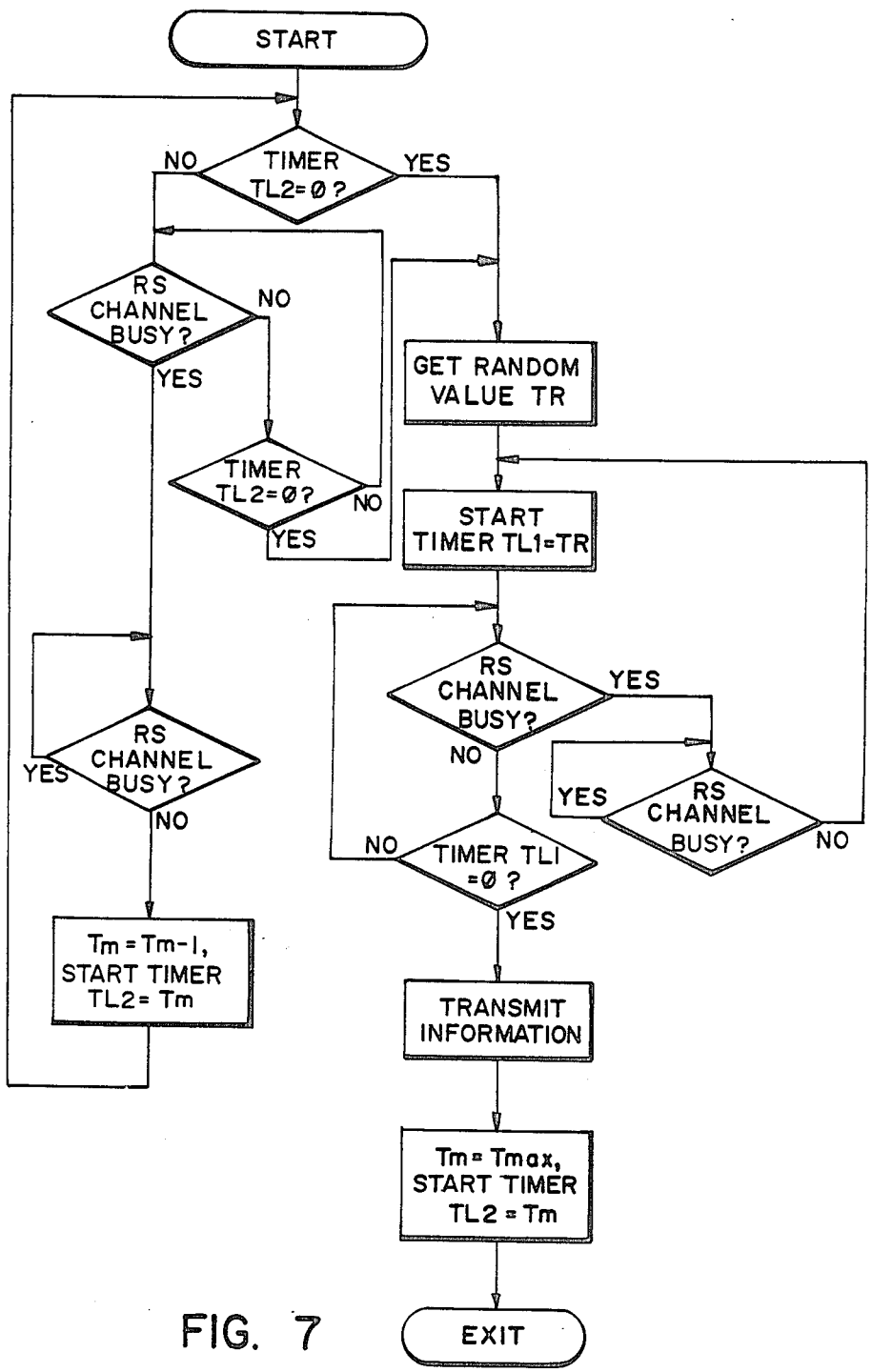
FIG. 7 is a simplified flow chart depicting an access mechanism to the radio signalling channel.

The simplified sequence of events is shown in FIG. 7.

1. All portable units 16 access the radio signalling (RS) channel after ensuring that the channel is not active. This is done by monitoring the RS channel status (carrier sense). Once the RS channel is detected to be inactive, a time TL1 is initialized to a random value (TR) and a transmission is scheduled to start when this timer times out. If the RS channel becomes active before TL1 times out, the transmission is descheduled (TL1 cleared) and the unit 16 returns to monitoring the RS channel status.

2. When TL1 times out, the unit 16 turns the Radio Frequency (RF) carrier on the RS channel on and transmits the information. After transmission, a timer TL2 is initialized to a value (Tm>max.TR) and started. No further access to the RS channel is allowed by the unit 16 until TL2 times out. Thus, immediately after sending its message, the unit 16 schedules itself as having the least priority to access the RS channel.

3. If an RS channel activity is detected while TL2 is active, TL2 is cleared, the unit 16 monitors the RS channel for inactivity, then TL2 is restarted with a higher priority (TL2=Tm−1). Every time that RS channel activity is detected, the unit 16 waits for the RS channel to become inactive and then raises its priority by restarting the timer TL2 with a smaller value. If TL2 has to be started with a value less than max.TR, the unit 16 becomes one of the high priority transmitters. In this case the unit 16 starts from step 1.

One preferred value for max.TR is 1000 microseconds. The resolution of the timers is preferably 100 microseconds. A preferred value for Tm is 2000 microseconds.

What is claimed is:

1. A private cellular system for providing a wireless communication service, said system characterized by:
 at least one base station for connection to a telephone switching means, said base station capable of transmitting and receiving simultaneously on a plurality of frequencies;
 a plurality of portable terminal units for communicating with said base station, each said portable terminal unit capable of receiving on at least a first frequency while simultaneously transmitting on a second frequency;
 each said portable terminal unit capable of scanning at least some of the plurality of frequencies on which said base station can transmit and said portable terminal unit can simultaneously receive two of said frequencies on which said base station can transmit;
 said portable terminal unit includes means to initiate a call by:
 (a) monitoring a common wireless signalling channel for communication between said portable terminal units and at least one base station;
 (b) sending a request for service message to said base station, when said common wireless signalling channel is deemed idle;
 (c) receiving offer messages destined for said terminal unit and sent by contending base stations;
 (d) evaluating each said offer message and accepting the offer message that meets the criteria of (i) the information channel offered by the base station is idle in the terminal unit's vicinity and (ii) the offer message has the best weighting of the signal strength of the terminal unit's signal as received by the base station, the received signal strength by the terminal unit, and any priority level given by the base station via the offer message;
 (e) acknowledging acceptance of one offer message by sending an acknowledge message to said base stations, said acknowledge message including the indentification of the base station whose offer has been accepted; and
 (f) turning on a corresponding up-link information channel, in response to the detection of a wireless carrier signal on the selected down-link information channel.

2. The private cellular system of claim 1 wherein said portable terminal unit further includes means to process, and means to act on, messages received on one of 5 said frequencies on which said base station can transmit.

3. The private cellular system of claim 1 wherein said communication service is a telephone service.

4. The private cellular system of claim 1 wherein said common wireless signalling channel, said down-link information channel, and said corresponding up-link information channel are all in the radio-frequency spectrum.

5. The private cellular system of claim 2 wherein each said base station further includes means to:
   (a) receive a request for service message from said portable terminal units;
   (b) evaluate each said request for service to ensure that it has been properly received, to ensure that there is a wireless information channel available, and that there is at least one land information channel available to said telephone switching means;
   (c) selectively send an offer to provide service message in response to the evaluation performed in step b;
   (d) receive an acknowledgement of acceptance of said offer message by a terminal unit whereby said base station turns on the down-link wireless information channel in response to the reception of said acknowledgement, otherwise said base station times out and returns to the idle state; and
   (e) receive a corresponding up-link wireless information channel and in response to the reception of said up-link wireless information channel, to connect said terminal unit to said telephone switching means.

6. A method of operating a private cellular system for providing a wireless communication service using a plurality of base stations and a plurality of portable terminal units, said method characterized by:
   (a) monitoring at each portable terminal unit the idle status of a common wireless signalling channel used for communication between said portable terminal units and said base stations;
   (b) selectively transmitting a request for access to an information channel between one said portable terminal unit and said base stations in response to said signalling channel being idle;
   (c) at each said base station that receives said request for access to an information channel (i) checking to see if the request was received properly, (ii) checking to ensure that there is at least one wireless information channel to offer, and (iii) checking to ensure that there is at least one land information channel available for use;
   (d) each base station that received said request and at which all three conditions of step c are met, selecting one wireless information channel to be offered to said portable terminal unit and transmitting, to said portable unit, an offer to provide service message, said message comprising the identification of the portable terminal unit to which the offer is directed, the offered channel identification, an indication of the received signal strength at that base station, and a priority code indicative of the load status of said base station;
   (e) said portable terminal unit evaluating each valid offer message and accepting the one that satisfies the conditions of (i) the offered information channel is idle in the portable unit's area, and (ii) the offer message having the best weighting of the signal strength as received by the base station, the received signal strength at the portable terminal unit, and the priority code;
   (f) the portable terminal unit acknowledging acceptance of one offer message by sending, via said wireless signalling channel, an acknowledge message containing the identification of the base station whose offer is being accepted;
   (g) the base station whose offer has been accepted, responding by turning on the carrier on the offered down-link wireless information channel; and
   (h) the portable terminal unit responding to the reception of the down-link carrier by turning on the corresponding up-link carrier.

7. A method of operating a private cellular system for providing a wireless communication service using a plurality of base stations connected to at least one telephone switching means, and a plurality of portable terminal units, said method at each said base station characterized by:
   (a) monitoring a wireless information channel to detect requests for access to an information channel, as sent by said portable terminal units;
   (b) in response to reception of a request for access to an information channel, performing the steps of (i) checking to see if the request was received properly, (ii) checking to ensure that there is at least one wireless information channel to offer; and (iii) checking to ensure that there is at least one land information channel available for use;
   (c) if all three conditions of step c are met, selecting one wireless information channel to be offered to said portable terminal unit and transmitting, to said portable terminal unit, an offer to provide service message, said message comprising the identification of the portable terminal unit to which the offer is directed, the offered channel identification, an indication of the received signal strength at that base station, and a priority code indicative of the load status of said base station; and
   (d) said base station, upon notification of acceptance of said offer, responding by turning on the carrier on the offered down-link wireless information channel, and if said offer is not accepted, said base station timing out and returning to the idle state.

8. The method of claim 7 further including the step of registration, whereby each base station receives periodically, registration messages from the portable terminal units and stores a list of the identification of those portable terminal units at said base station.

9. A method of operating a private cellular system for providing a wireless communication service using a plurality of base stations connected to at least one telephone switching means, and a plurality of portable terminal units, said method at each said portable terminal unit characterized by:
   (a) monitoring the idle status of a common wireless signalling channel used for communication between said portable terminal units and said base stations;
   (b) selectively transmitting a request for access to an information channel between said portable terminal unit and one said base station in response to said signalling channel being idle;

(c) monitoring said common wireless signalling channel for offer to provide service messages from said base stations, and evaluating each valid offer message and accepting the one that satisfies the conditions of (i) the offered information channel is idle in the portable unit's area, and (ii) the offer message having the best weighting of the signal strength as received by the base station, the received signal strength at the portable terminal unit, and a priority code; and (d) acknowledging acceptance of one offer message by sending, via said wireless signalling channel, an acknowledge message containing the identification of the base station whose offer is being accepted.

10. A base station for use in the operation of a private cellular system for providing a wireless communication service using a plurality of base stations connected to at least one telephone switching means, and a plurality of portable terminal units, said base station characterized by:

(a) first means for monitoring a wireless information channel to detect requests for access to an information channel, as sent by said portable terminal units;

(b) second means, responsive to reception of a request for access to an information channel for performing the steps of (i) checking to see if the request was received properly, (ii) checking to ensure that there is at least one wireless information channel to offer; and (iii) checking to ensure that there is at least one land information channel available for use;

(c) third means, responsive to the output of said second means, for selecting one wireless information channel to be offered to said portable terminal unit and for transmitting, to said portable terminal unit, an offer to provide service message, said message comprising the identification of the portable terminal unit to which the offer is directed, the offered channel identification, an indication of the received signal strength at that base station, and a priority code indicative of the load status of said base station; and (d) fourth means, responsive to notification of acceptance of said offer, for turning on the carrier on the offered down-link wireless information channel, and if said offer is not accepted, for timing out and returning said base station to the idle state.

11. A portable terminal unit for use in the operation of a private cellular system for providing a wireless communication service using a plurality of base stations connected to at least one telephone switching means, and a plurality of portable terminal units, said portable terminal unit characterized by:

(a) first means for monitoring the idle status of a common wireless signalling channel used for communication between said portable terminal units and said base stations;

(b) second means for selectively transmitting a request for access to an information channel between said portable terminal unit and one said base station in response to said signalling channel being idle;

(c) third means for monitoring said common wireless signalling channel for offer to provide service messages from said base stations, and for evaluating each valid offer message and for accepting the one that satisfies the conditions of (i) the offered information channel is idle in the portable unit's area, and (ii) the offer message having the best weighting of the signal strength as received by the base station, the received signal strength at the portable terminal unit, and a priority code; and (d) a fourth means for acknowledging acceptance of one offer message by sending, via said wireless signalling channel, an acknowledge message containing the identification of the base station whose offer is being accepted.

* * * * *